(12) United States Patent
Schondorf et al.

(10) Patent No.: US 7,690,459 B2
(45) Date of Patent: Apr. 6, 2010

(54) HYBRID ELECTRIC VEHICLE AND POWERTRAIN

(75) Inventors: Steven Schondorf, Dearborn, MI (US); Brandon Masterson, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 660 days.

(21) Appl. No.: 11/468,356

(22) Filed: Aug. 30, 2006

(65) Prior Publication Data

US 2008/0078591 A1 Apr. 3, 2008

(51) Int. Cl.
*B60K 17/04* (2006.01)

(52) U.S. Cl. ............... 180/65.6; 180/65.275; 903/912; 903/945

(58) Field of Classification Search ............ 180/65.275, 180/65.28, 65.285, 65.6, 65.7; 903/910, 903/911, 912, 914, 915, 945, 946
See application file for complete search history.

(56) References Cited

U.S. PATENT DOCUMENTS

| | | | |
|---|---|---|---|
| 4,768,636 A * | 9/1988 | Ito et al. ................ 477/71 |
| 5,847,469 A | 12/1998 | Tabata et al. |
| 6,540,631 B2 | 4/2003 | Holmes |
| 6,634,986 B2 * | 10/2003 | Kima ................ 477/107 |
| 6,722,332 B2 * | 4/2004 | Kojima ................ 123/179.3 |
| 7,081,060 B2 * | 7/2006 | Hata et al. ............... 475/5 |
| 2004/0112654 A1 | 6/2004 | Kozarekar et al. |
| 2005/0049100 A1 | 3/2005 | Ai et al. |
| 2006/0019785 A1 | 1/2006 | Holmes et al. |

* cited by examiner

*Primary Examiner*—Paul N Dickson
*Assistant Examiner*—John D Walters
(74) *Attorney, Agent, or Firm*—David B. Kelley; Brooks Kushman P.C.

(57) ABSTRACT

A hybrid electric vehicle and powertrain include an engine operable to output torque in only one direction, and further includes a power transfer arrangement configured to provide output torque in two rotational directions. In one embodiment, the power transfer arrangement includes three gears and a single clutch, the configuration of which provides a simple mechanism for driving the vehicle in reverse using torque produced by the engine.

20 Claims, 2 Drawing Sheets

HYBRID ELECTRIC VEHICLE AND POWERTRAIN

BACKGROUND OF THE INVENTION

1. Field of the Invention

The present invention relates to a hybrid electric vehicle and a powertrain for such a vehicle.

2. Background Art

With the ever increasing need to produce vehicles that are more fuel efficient, hybrid electric vehicles (HEV's) have provided an improvement in fuel economy over many conventional vehicles that utilize only an internal combustion engine to drive the vehicle. One of the primary advantages of an HEV is that it allows the vehicle to be powered by one or more electric machines under certain operating conditions. For example, if the speed of the vehicle is relatively moderate, and the battery or other electrical power source is sufficiently charged, the engine may be shut off, and the vehicle powered exclusively by the electric motors. As operating conditions change, the engine may be started to provide additional power, and if needed, operate a generator to charge the battery.

Various arrangements of internal combustion engines and electric machines—i.e., generators and motors—have been utilized in HEV's. For example, series arrangements, parallel arrangements, and power-split arrangements provide different ways for the engine and electric machines to interact to output torque to drive the vehicle. In one example of a power-split arrangement, an engine and an electric machine are both operatively connected to a planetary gear set, the output of which provides torque to the vehicle drive wheels. One or more additional electric machines can be used to provide additional torque to the drive wheels, charge an energy storage device, such as a battery, provide electrical energy directly to another electric machine, or some combination thereof.

In the power-split arrangement, power output from the engine flows through the planetary gear set, where a portion of the power is applied to the electric machine connected to the planetary gear set, and another portion of the engine power is transferred to the vehicle drive wheels. In some power split arrangements, a second electric machine—e.g., a motor not connected to the planetary gear set—is used to drive the vehicle in reverse. This is a relatively simple operation, in that an electric motor can be operated to output torque in either of two opposite rotational directions. This eliminates the need for complex gear and clutch systems that may otherwise be required to drive the vehicle in reverse. Because internal combustion engines are configured to provide power in one direction only, many HEV's rely exclusively on one or more electric machines to drive the vehicle in reverse.

Although electric motors provide a convenient way to drive an HEV in reverse, additional torque may be desired in some situations. For example, in off-road situations, or where traction is bad, an operator may desire a greater reverse torque than a motor can generally provide. In such situations, it would be desirable to use the engine in the HEV to drive the vehicle in reverse.

One example of an HEV that is configured to allow the engine to output torque to drive the vehicle in reverse is described in U.S. Pat. No. 5,847,469 issued to Tabata et al. on Dec. 8, 1998. Tabata et al. describes an HEV that allows either the engine or the electric motor to drive the vehicle in reverse. In order to accomplish this, the vehicle described in Tabata et al. includes an elaborate series of gears, clutches, and brakes to manipulate the torque output from the engine, such that it is capable of driving the vehicle in reverse. The system described in Tabata et al. contains many elements, each of which has to interact with one or more other elements, thereby adding complexity, weight, and additional cost to the vehicle. Therefore, it would be desirable to have an HEV, and a powertrain for an HEV, that were configured to allow torque from the engine to drive the vehicle in reverse, without adding a large number of components that would undesirably increase the complexity and cost of the vehicle, and reduce the efficiency of its operation.

SUMMARY OF THE INVENTION

Accordingly, the present invention provides a hybrid electric vehicle and a powertrain having a simple power transfer arrangement that allows torque from the engine to be output to vehicle drive wheels to drive the vehicle in reverse.

In some embodiments, the invention also provides a hybrid electric vehicle having an engine and a motor/generator connected to a planetary gear set. The output from the planetary gear set is connected to an input of a power transfer arrangement that can change the direction of the torque output from the planetary gear set before it reaches the vehicle wheels.

Embodiments of the power transfer arrangement of the present invention provide advantages over existing configurations by providing a mechanism for utilizing the torque from the engine to drive the vehicle in reverse, without employing an expensive and complicated system of gears, clutches, and brakes.

In one embodiment of the present invention, a power transfer arrangement is disposed between the planetary gear set and an input to the vehicle drive wheels. In this embodiment, the power transfer arrangement includes a dog clutch and three gears. An input shaft brings torque into the power transfer arrangement, and rotates the dog clutch. Two of the three gears are disposed around the input shaft, such that they do not rotate unless they are engaged with the dog clutch. The dog clutch is movable along the input shaft to selectively engage either of the two gears. One of the gears is operatively connected to an output of the power transfer arrangement, such that when it is engaged with the dog clutch, the torque entering the power transfer arrangement from the input shaft is directly transferred to the output of the power transfer arrangement through the one gear. Thus, the one gear rotates the output of the power transfer arrangement in a first direction.

The dog clutch is also engagable with the second of the two gears disposed around the input shaft, such that this second gear will rotate with the input shaft, when it is engaged with the dog clutch. The third of the three gears is disposed between the second gear and the output of the power transfer arrangement. This reverses the rotation of the output when the dog clutch is engaged with the second gear. The reverse rotation of the output from the power transfer arrangement drives the vehicle in reverse. Therefore, this embodiment of the present invention provides an uncomplicated way to utilize engine torque to drive the vehicle in reverse.

In another embodiment of the present invention, the power transfer arrangement contains two clutches and two gears. A single input shaft provides torque into the power transfer arrangement, and two output shafts provide output torque to drive the vehicle. The first gear is disposed on the input shaft, and the first clutch is disposed between the first gear and the first output shaft. Engaging the first clutch effects a transfer of torque between the input shaft and the first output shaft. In this configuration, the first output shaft rotates in the same direction as the input shaft. The second gear of the power transfer arrangement intermeshes with the first gear, and rotates in a direction opposite the rotation of the input shaft. The second clutch is disposed between the second gear and the second output shaft, and engaging the second clutch causes the second output shaft to rotate in the opposite direction of the input shaft. This drives the vehicle in reverse.

The invention also provides a hybrid electric vehicle having a plurality of wheels, including at least one drive wheel having an input arrangement connected thereto. The vehicle includes an engine operable to output torque to drive the vehicle, and a first electric machine operable as a motor to output torque to drive the vehicle, and operable as a generator to output electrical energy. The vehicle also includes a first power transfer arrangement cooperating with the engine and the first electric machine to provide a portion of a power flow path between the engine and the at least one drive wheel, and a portion of another power flow path between the first electric machine and the at least one drive wheel. The power transfer arrangement includes a planetary gear set having a plurality of members, including a sun gear, a plurality of planet gears, a carrier connecting the planet gears to each other, and a ring gear. One of the members of the planetary gear set provides an output for the planetary gear set. The engine is operable to output torque to rotate the output of the planetary gear set in a first rotational direction.

A second power transfer arrangement is disposed between the output of the planetary gear set and the input arrangement of the at least one drive wheel. The second power transfer arrangement includes a plurality of gears, a single one of the gears of the second power transfer arrangement is selectively engagable to transfer torque between the output of the planetary gear set and the input arrangement of the at least one drive wheel. This causes the vehicle to be driven in a forward direction when the engine is operating to output torque to rotate the output of the planetary gear set in the first rotational direction. One pair of the gears of the second power transfer arrangement is selectively engagable to transfer torque between the output of the planetary gear set and the input of the at least one drive wheel, such that the vehicle is driven in a reverse direction when the engine is operating to output torque to rotate the output of the planetary gear set in the first rotational direction.

The invention further provides a hybrid electric vehicle as generally described above wherein the sun gear of the planetary gear set is operatively connected to either the first electric machine or the engine. The carrier is operatively connected to the other one of the first electric machine and the engine, and the ring gear provides a torque output for the planetary gear set when at least one of the engine or the first electric machine provides a torque input to the planetary gear set.

A power transfer arrangement is disposed between the ring gear and the input arrangement of the at least one drive wheel, and includes at least two gears. A single one of the gears is selectively engagable to receive torque from the ring gear and to provide torque to the input arrangement of the at least one drive wheel to drive the vehicle in a forward direction. Two of the gears are selectively engagable to receive torque from the ring gear and to provide torque to the input arrangement of the at least one drive wheel to drive the vehicle in a reverse direction.

The vehicle also includes a second electric machine operable to rotate an output shaft in a first rotational direction and a second rotational direction opposite the first rotational direction. For a given engagement of the gears in the power transfer arrangement, operating the second electric machine to rotate the output shaft in one direction provides torque to drive the vehicle in the forward direction, while operating the second electric machine to rotate the output shaft in the other direction provides torque to drive the vehicle in reverse. In this way, the engine or the second electric machine can be the sole torque producer to drive the vehicle in reverse, or they can work together such that each provides a portion of this torque.

The invention also provides a powertrain for a hybrid electric vehicle having a plurality of wheels, including at least one drive wheel having an input arrangement connected thereto. The powertrain includes a powertrain output configured for connection to the input arrangement of the at least one drive wheel to facilitate torque transfer between the powertrain and the at least one drive wheel. The powertrain also includes a plurality of torque-producing devices, including an engine and a first electric machine. Each of the engine and the first electric machine is operable to output torque to the powertrain output. A power transfer arrangement is disposed between the engine and the powertrain output. The power transfer arrangement includes at least two gears, a single one of the gears is selectively engagable to receive torque from the engine and to provide torque to rotate the powertrain output in a first direction. Two of the gears are selectively engagable to receive torque from the engine and to provide torque to rotate the powertrain output in a second direction.

As discussed above, in some embodiments of the present invention, the power transfer arrangement includes a dog clutch. This provides a simple mechanism for selectively engaging one gear to drive the vehicle in a forward direction, and a pair of gears to drive the vehicle in the reverse direction. In other embodiments, this clutch can be an electric or hydraulically actuated clutch having a series of clutch plates configured to interact with one another to provide the torque transfer. Actuation of the clutch or clutches can be facilitated through mechanical linkages between an operator shift lever and the power transfer arrangement, or alternatively, can be facilitated through the use of electronic signals that are output when the vehicle operator chooses to operate the vehicle in reverse. The electronic signals can then be used to operate an actuator or actuators, such as a solenoid or a hydraulic pump in order to engage the clutch. Regardless of the particular clutch configuration, the present invention allows engine torque to be transferred to the vehicle wheels to drive the vehicle in reverse, and does so through a power transfer arrangement that is not overly complex and cost prohibitive.

DETAILED DESCRIPTION OF THE PREFERRED EMBODIMENT(S)

Figure 1:
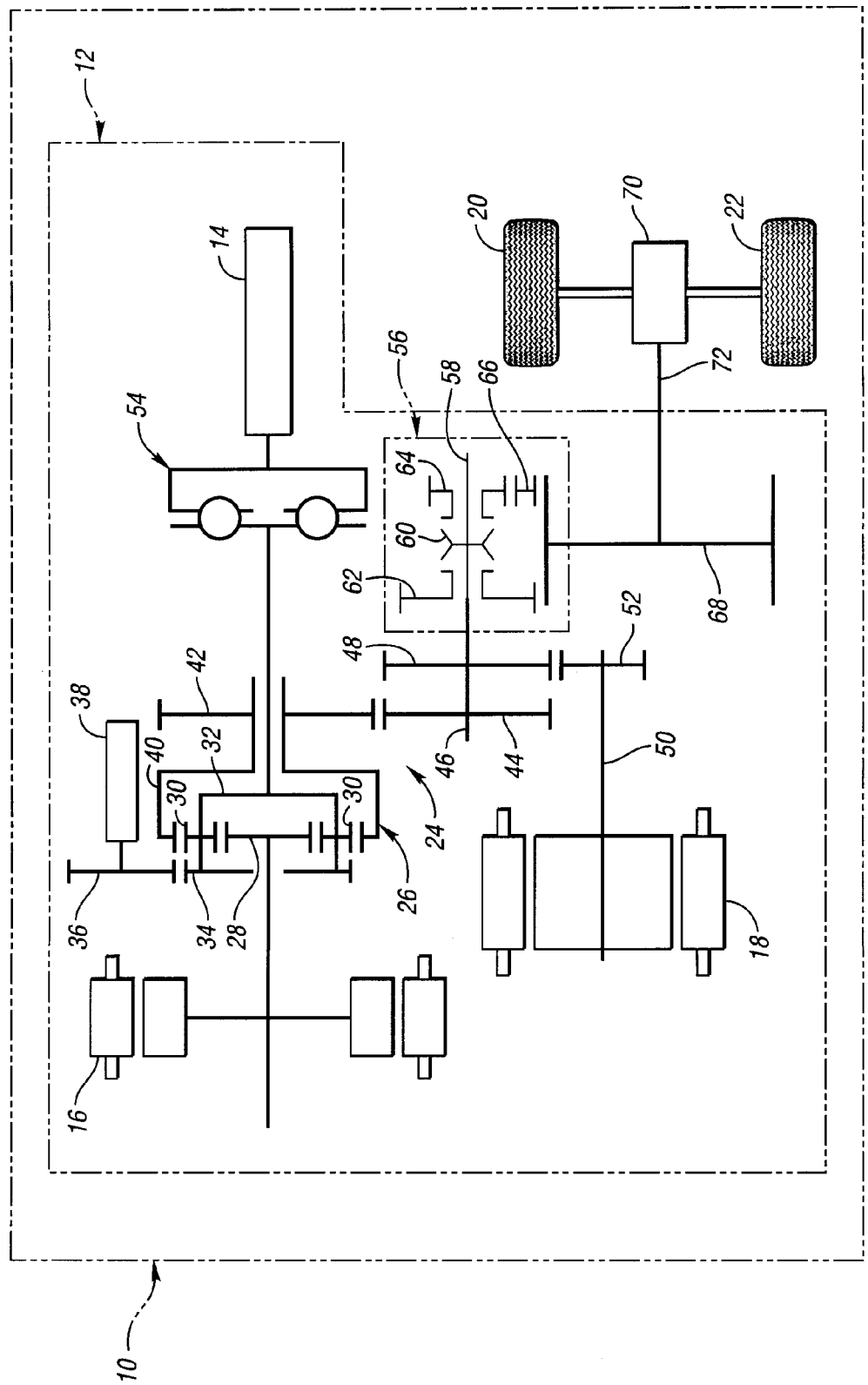
FIG. 1 shows a schematic representation of a vehicle and powertrain in accordance with one embodiment of the present invention.

FIG. 1 shows a vehicle 10 and powertrain 12 in accordance with one embodiment of the present invention. The powertrain 12 of the vehicle 10 includes three torque-producing devices: an engine 14, a first electric machine 16, and a second electric machine 18. Both the first and second electric machines 16, 18 are operable to output torque to vehicle drive wheels 20, 22. In addition, each of the electric machines 16, 18 is operable to receive torque and to output electrical energy. For convenience, the first electric machine 16 will be referred to hereinafter as a generator, and a second electric machine 18 will be referred to as a motor, although both machines 16, 18 can be operated in either capacity.

The engine 14 and the generator 16 are both connected to a first power transfer arrangement 24 that includes a planetary gear set 26. The planetary gear set 26 includes a sun gear 28, and a plurality of planet gears 30, which are connected to each other by a carrier 32. In the embodiment shown in FIG. 1, the carrier 32 is also connected to a gear 34 that intermeshes with and drives a gear 36 connected to an oil pump 38. The oil pump provides oil to the engine 14, although for clarity, the hydraulic connections are not shown in FIG. 1. The planetary gear set 26 also includes a ring gear 40, which provides the output for the planetary gear set 26. The ring gear 40 is connected to an output gear 42, which intermeshes with a gear 44. The gear 44 is disposed on a shaft 46, which also has another gear 48 mounted thereon. The planetary gear set 26, and the gears 42, 44, 46, 48 all make up part of the first power transfer arrangement 24, which provides a portion of a power flow path between the engine 14 and the vehicle drive wheels 20, 22, and a portion of a power flow path between the generator 16 and the vehicle drive wheels 20, 22.

As shown in FIG. 1, the motor 18 includes an output shaft 50 having a gear 52 mounted thereon. The gear 52 intermeshes with the gear 48, such that the shaft 46 can receive torque from one or both of the engine 14 and the generator 16 through the planetary gear set 26, and also from the motor 18. As well known in the art, the shaft 46 may also receive torque from the vehicle drive wheels 20, 22, for example, during braking, such that torque is transferred back to one or both of the generator 16 and the motor 18. In the embodiment shown in FIG. 1, a mechanical spring damper assembly 54 is disposed between the engine 14 and the carrier 32. It is understood that in other embodiments, the damper assembly 54 may be omitted.

The vehicle 10 and the powertrain 12 also include a second power transfer arrangement 56. The power transfer arrangement 56 includes an input shaft 58 connected to the shaft 46. Disposed on the input shaft 58 is a dog clutch 60, though other types of clutches may be used. Dog clutches, such as the dog clutch 60, are relatively uncomplicated devices that facilitate a connection between rotating elements. In the embodiment shown in FIG. 1, the dog clutch 60 is selectively engagable with first and second gears 62, 64, each of which is part of the second power transfer arrangement 56. The second power transfer arrangement 56 also includes a third gear 66 that intermeshes with the second gear 64. Depending on the operation of the clutch 60, either the first gear 62 or the third gear 66 can provide the output of the power transfer arrangement 56.

The first gear 62 and the third gear 66 each intermesh with a gear 68, which may be considered an input gear for differential 70. The differential 70 includes an input arrangement, which, in the embodiment shown in FIG. 1, includes the gear 68 and a shaft 72. As shown in FIG. 1, the clutch 60 is not engaged with the gear 62 or the gear 64. Therefore, the vehicle 10 is currently in neutral, and none of the torque output from any of the torque-producing devices 14, 16, 18 will reach the vehicle drive wheels 20, 22. This provides another advantage of the present invention, in that many power-split configurations of HEV's do not include a true neutral. That is, to provide the vehicle operator with a neutral transmission setting, the engine may be shut off and the motors operated to output zero torque, or alternatively, the motors can be operated to balance any torque output by the engine, such that the drive wheels receive no net torque from the powertrain. With the power transfer arrangement 56 of the present invention, selective use of the clutch 60 can provide a true neutral operational state for the vehicle 10.

To drive the vehicle 10 in a forward direction, the clutch 60 is engaged with the first gear 62, such that the gear 62 rotates in the same direction as the input shaft 58. This causes rotation of the gear 68 and the shaft 72, thereby providing torque to the vehicle drive wheels 20, 22 through the differential 70. The torque may be provided by one or both of the engine 14 and the generator 16. In addition, with the first gear 62 engaged, the motor 18 can be operated to rotate the output shaft 50 in a first rotational direction to provide torque to drive the vehicle 10 in the forward direction. Thus, the vehicle 10 can be driven forward by the engine 14, the generator 16, the motor 18 or some combination of the three.

When the clutch 60 is engaged with the second gear 64, the second gear 64 will rotate the third gear 66 in a direction opposite the rotational direction of the input shaft 58. This rotates the gear 68 in the opposite direction, and results in the vehicle 10 being driven in the reverse direction. Thus, even though the engine 14 outputs torque to rotate the ring gear 40 of the planetary gear set 26 in only one direction, operation of the power transfer arrangement 56 allows engine torque to be utilized to drive the vehicle 10 in the reverse direction. Of course, the generator 14 can also be operated to provide torque to the ring gear 40, and the motor 18 can provide torque to the power transfer arrangement 56 through the gears 48, 52.

The motor 18 can also be used to drive the vehicle 10 in reverse when the clutch 60 is engaged with the first gear 62. Operating the motor 18 to rotate the output shaft 50 in a second rotational direction opposite the first rotational direction will drive the vehicle 10 in reverse when the first gear 62 is engaged. As discussed above, operation of the clutch 60 can be effected through a gear selection device available to the vehicle operator. The specific mechanism by which the clutch 60 is operated, can be, for example, electrical, mechanical, hydraulic, or some combination thereof, depending on the particular application.

Figure 2:
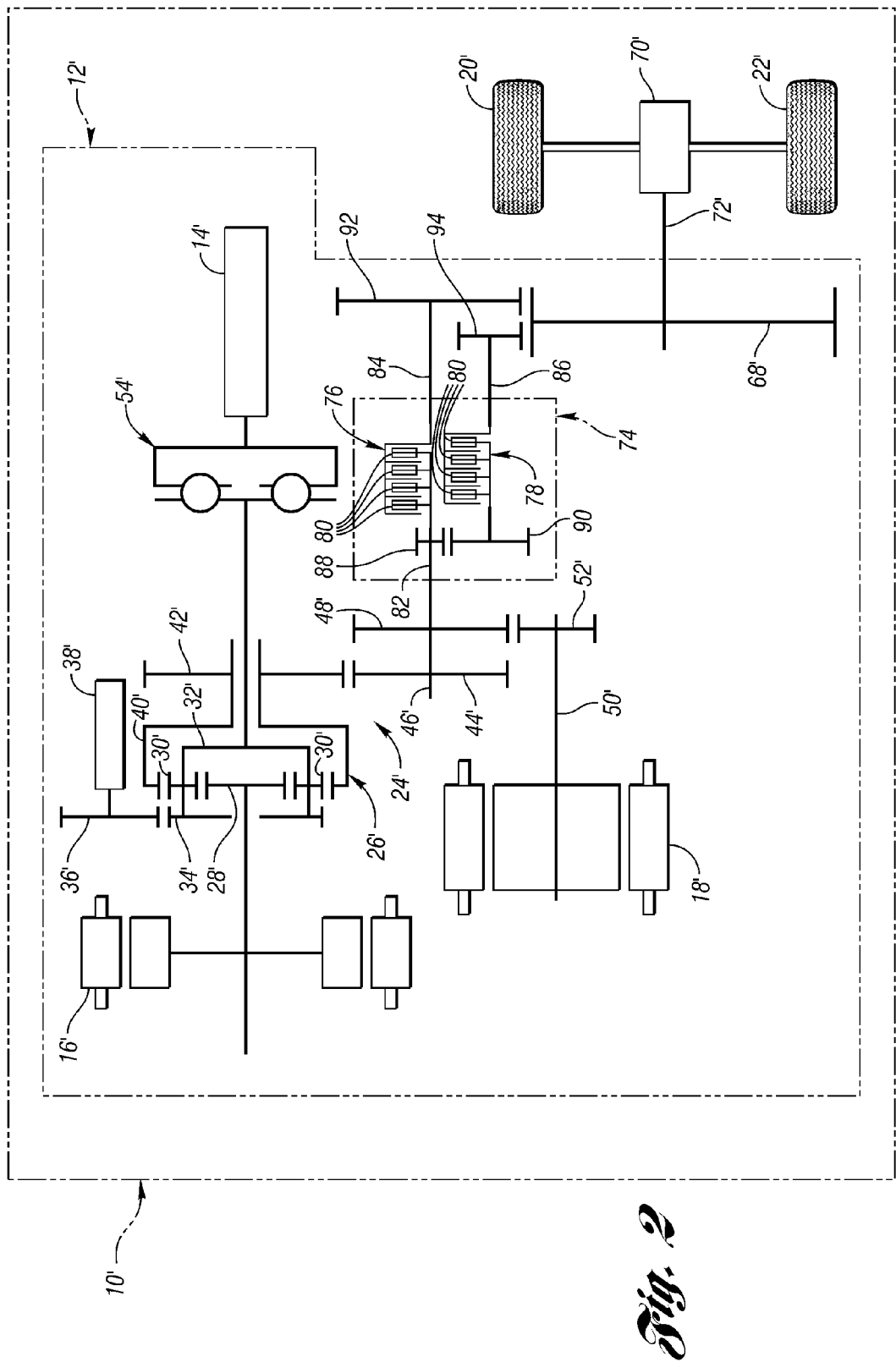
FIG. 2 shows a schematic representation of a vehicle and powertrain in accordance with another embodiment of the present invention.

FIG. 2 shows a vehicle 10' having a powertrain 12' in accordance with another embodiment of the present invention. Throughout the description of the vehicle 10', and the powertrain 12', elements having counterparts in the vehicle 10 shown in FIG. 1, are marked with the prime (') symbol. Similar to the powertrain 12, the powertrain 12' can include three torque-producing devices: an engine 14', a generator 16', and a motor 18'. The engine 14' outputs torque to a carrier 32' of a planetary gear set 26'. A ring gear 40' provides the output for the planetary gear set 26'.

As with the engine 14 shown in FIG. 1, the engine 14' is operable to rotate the ring gear 40' in only one direction. Therefore, in order to provide a mechanism for driving the vehicle 10 in a reverse direction using torque output from the engine 14', the powertrain 12' includes a power transfer arrangement 74. The power transfer arrangement 74 includes first and second clutches 76, 78. Unlike the dog clutch 60 shown in FIG. 1, the clutches 76, 78 include a plurality of friction plates 80 configured to facilitate torque transfer from an input shaft 82 to respective output shafts 84, 86 of the power transfer arrangement 74. The power transfer arrangement 74 includes only two gears 88, 90. The first gear 88 is mounted on the input shaft 82, and intermeshes with the second gear 90.

The first clutch 76 is disposed between the first gear 88 and the first output shaft 84. Thus, when the first clutch 76 is engaged, the first output shaft 84 rotates in the same direction as the input shaft 82, and rotates an output gear 92 that intermeshes with the input gear 68' connected to the differential input shaft 72'; this drives the vehicle 10' in a forward direction. Conversely, when the first clutch 76 is disengaged, and the second clutch 78 is engaged, the second output shaft 86 provides torque to a second output gear 94 in a direction opposite the direction of rotation of the input shaft 82. This rotates the input gear 68', and drives the vehicle 10' in the reverse direction. The output gears 92, 94 provide torque flow paths from the input shaft 82 to the input shaft 72' of the differential 70'.

Although the powertrain 12' shown in FIG. 2 includes the two output gears 92, 94 to provide the torque flow paths from the power transfer arrangement 74 to the input gear 68', it is worth noting that other configurations can be used. The power transfer arrangement 74 provides two output shafts 84, 86, which are configured to rotate in directions opposite each other. Therefore, although the engine 14' outputs torque in only one direction, by the time the torque flow has passed through the power transfer arrangement 74, either of two rotational directions can be selected. As with the embodiment shown in FIG. 1, the reverse direction for the vehicle 10' may be selected by a vehicle operator using a transmission selector device. The clutch plates 80 can be engaged using actuators powered by electrical, mechanical, hydraulic, or pneumatic systems, or some combination thereof.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A hybrid electric vehicle having a plurality of wheels, including at least one drive wheel having an input arrangement connected thereto, the vehicle comprising:

an engine operable to output torque to drive the vehicle;

a first electric machine operable as a motor to output torque to drive the vehicle, and operable as a generator to output electrical energy:

a first power transfer arrangement cooperating with the engine and the first electric machine to provide a portion of a power flow path between the engine and the at least one drive wheel, and a portion of another power flow path between the first electric machine and the at least one drive wheel, the first power transfer arrangement including a planetary gear set having a plurality of members, including a sun gear, a plurality of planet gears, a carrier connecting the planet gears to each other, and a ring gear, one of the members of the planetary gear set providing an output for the planetary gear set, the engine being operable to output torque to rotate the output of the planetary gear set in a first rotational direction; and a second power transfer arrangement disposed between the output of the planetary gear set and the input arrangement of the at least one drive wheel, the second power transfer arrangement including a plurality of gears, a single one of the gears of the second power transfer arrangement being selectively engageable to transfer torque between the output of the planetary gear set and the input arrangement of the at least one drive wheel such that the vehicle is driven in a forward direction when the engine is operating to output torque to rotate the output of the planetary gear set in the first rotational direction, and one pair of the gears of the second power transfer arrangement being selectively engageable to transfer torque between the output of the planetary gear set and the input of the at least one drive wheel such that the vehicle is driven in a reverse direction when the engine is operating to output torque to rotate the output of the planetary gear set in the first rotational direction.

2. The vehicle of claim 1, wherein the second power transfer arrangement further includes an input, an output, and a clutch, the clutch being operable to selectively engage the single one of the gears such that torque is transferred from the input to the output of the second power transfer arrangement through the single one of the gears, and to selectively engage the pair of gears such that torque is transferred from the input to the output of the second power transfer arrangement through the pair of gears.

3. The vehicle of claim 2, wherein the second power transfer arrangement includes three of the gears, one of the three gears being the single one of the gears, and the other two of the three gears being the pair of gears, the single one of the gears being driven by the input of the second power transfer arrangement and providing the output for the second power transfer arrangement when the clutch is engaged with the single one of the gears, a first gear of the pair of gears being driven by the input of the second power transfer arrangement, and a second gear of the pair of gears intermeshing with the first gear of the pair of gears to provide the output for the second power transfer arrangement when the clutch is engaged with the first gear of the pair of gears.

4. The vehicle of claim 3, wherein the input to the second power transfer arrangement includes an input shaft, and the clutch includes a dog clutch disposed on the input shaft, the single one of the gears and the first gear of the pair of gears being disposed around the input shaft such that either rotates with the shaft only when it is engaged with the dog clutch.

5. The vehicle of claim 4, wherein the single one of the gears and the second gear of the pair of gears are connected to and rotate with the input arrangement of the at least one drive wheel.

6. The vehicle of claim 2, wherein the second power transfer arrangement includes two of the clutches and exactly two of the gears, a first gear of the two gears being the single one of the gears, and both gears of the two gears being the pair of gears, the first gear of the two gears being connected to and rotating with the input of the second power transfer arrangement, the other gear of the two gears intermeshing with the first gear of the two gears such that it rotates in a direction opposite the first gear of the two gears.

7. The vehicle of claim 6, wherein a first of the clutches is operable to selectively engage the first gear of the two gears to transfer torque from the first gear of the two gears to the output of the second power transfer arrangement, and the second clutch is operable to selectively engage the second gear of the two gears to transfer torque from the second gear of the two gears to the output of the second power transfer arrangement.

8. The vehicle of claim 7, further comprising a second electric machine with an output shaft, the second electric machine being operable to rotate the output shaft in a first rotational direction and a second rotational direction opposite the first rotational direction, thereby providing torque to selectively drive the vehicle in the forward direction and the reverse direction.

9. A hybrid electric vehicle having a plurality of wheels, including at least one drive wheel having an input arrangement connected thereto, the vehicle comprising:

an engine operable to output torque to drive the vehicle;

a first electric machine operable as a motor to output torque to drive the vehicle, and operable as a generator to output electrical energy:

a planetary gear set including a sun gear, a plurality of planet gears, a carrier connecting the planet gears to each other, and a ring gear, the sun gear being operatively connected to one of the first electric machine and the engine, the carrier being operatively connected to the other one of the first electric machine and the engine, and the ring gear providing an output for the planetary gear set when at least one of the engine or the first electric machine provide a torque input to the planetary gear set;

a second electric machine with an output shaft, the second electric machine being operable to rotate the output shaft in a first rotational direction to output torque to drive the vehicle in a forward direction, and further operable to rotate the output shaft in a second rotational direction opposite a first rotational direction to drive the vehicle in the reverse direction; and a power transfer arrangement disposed between the ring gear and the input arrangement of the at least one drive wheel, the power transfer arrangement including at least two gears, a single one of the gears being selectively engageable to receive torque from the ring gear and to provide torque to the input arrangement of the at least one drive wheel to drive the vehicle in the forward direction, exactly two of the gears being selectively engageable to receive torque from the ring gear and to provide torque to the input arrangement of the at least one drive wheel to drive the vehicle in the reverse direction.

10. The vehicle of claim 9, wherein the power transfer arrangement includes an input shaft, a dog clutch operatively mounted thereon, and exactly three of the gears, the dog clutch being separately engageable with two of the gears which are each disposed around the input shaft, a third of the gears intermeshing with one of the two gears disposed around the input shaft such that the third gear rotates in a direction opposite the other two gears, the third gear being operatively connected to the input arrangement of the at least one drive wheel, thereby facilitating a torque transfer from the engine to the at least one drive wheel to drive the vehicle in the reverse direction.

11. The vehicle of claim 9, wherein the power transfer arrangement includes an input shaft, two output shafts, two clutches, and exactly two of the gears.

12. The vehicle of claim 11, wherein a first of the gears is disposed on the input shaft, and a first of the clutches is disposed between the first gear and a first of the output shafts such that the first output shaft rotates in the same direction as the input shaft when the first clutch is engaged.

13. The vehicle of claim 12, wherein the second of the gears intermeshes with the first gear to rotate in a direction opposite rotation of the first gear, a second of the clutches being disposed between the second gear and a second of the output shafts such that the second output shaft rotates in a direction opposite the rotation of the input shaft when the second clutch is engaged.

14. The vehicle of claim 13, wherein the input arrangement of the at least one drive wheel includes a shaft, the vehicle further comprising:

an input gear mounted to the shaft of the input arrangement of the at least one drive wheel; and two output gears, each of which is mounted to a respective one of the output shafts of the power transfer arrangement, and each of which intermeshes with the input gear, thereby providing a pair of torque flow paths between the input shaft of the power transfer arrangement and the at least one drive wheel.

15. A powertrain for a hybrid electric vehicle having a plurality of wheels, including at least one drive wheel having an input arrangement connected thereto, the powertrain comprising:

a powertrain output configured for connection to the input arrangement of the at least one drive wheel to facilitate torque transfer between the powertrain and the at least one drive wheel;

a plurality of torque-producing devices, including an engine and a first electric machine, each of which is operable to output torque to the powertrain output; and a power transfer arrangement disposed between the engine and the powertrain output, the power transfer arrangement including at least two gears, a single one of the gears being selectively engageable to receive torque from the engine and to provide torque to rotate the powertrain output in a first direction, two of the gears being selectively engageable to receive torque from the engine and to provide torque to rotate the powertrain output in a second direction.

16. The powertrain of claim 15, wherein the power transfer arrangement includes an input shaft, exactly three of the gears, and a dog clutch mounted on the input shaft and separately engageable with first and second gears of the three gears, the first gear being operatively connected to the powertrain output to rotate the powertrain output in the first direction when the clutch is engaged with the first gear, a third of the gears intermeshing with the second gear such that the third gear rotates in a direction opposite the first and second gears, the third gear being operatively connected to the powertrain output to rotate the powertrain output in the second direction when the clutch is engaged with the second gear.

17. The powertrain of claim 15, wherein the power transfer arrangement includes an input shaft, two output shafts, two clutches, and exactly two of the gears.

18. The powertrain of claim 17, wherein a first of the gears is disposed on the input shaft, and a first of the clutches is disposed between the first gear and a first of the output shafts such that the first output shaft rotates in the same direction as the input shaft when the first clutch is engaged.

19. The powertrain of claim 18, wherein the second of the gears intermeshes with the first gear to rotate in a direction opposite rotation of the first gear, a second of the clutches being disposed between the second gear and a second of the output shafts such that the second output shaft rotates in a direction opposite the rotation of the input shaft when the second clutch is engaged.

20. The powertrain of claim 19, wherein the powertrain output includes and output gear, the powertrain further comprising two output gears, each of which is mounted to a respective one of the output shafts of the power transfer arrangement, and each of which intermeshes with the output gear, thereby providing a pair of torque flow paths between the input shaft of the power transfer arrangement and the powertrain output.

* * * * *